United States Patent Office

3,089,821
Patented May 14, 1963

3,089,821
PROCESS FOR THE PREPARATION OF LIPIDS
Karl Folkers, Plainfield, N.J., assignor to Merck & Co., Inc., Rahway, N.J., a corporation of New Jersey
No Drawing. Filed Oct. 28, 1959, Ser. No. 849,135
4 Claims. (Cl. 167—78)

This invention relates to improved processes for the preparation of lipids. More particularly, it is concerned with a greatly simplified and highly practical process for the preparation of a lipid from bacterial cells containing lipopolysaccharides.

The preparation of such lipids from bacteria by methods known in the art has hitherto been a lengthy, tedious, complicated process, involving washing, waterphenol partition, concentration, dialysis, separation of purified lipopolysaccharide fractions by multiple reprecipitations or ultra-centrifugation, hydrolysis of the lipopolysaccharide and extraction of the lipid fraction.

While the lipopolysaccharide itself has high biological activity, the associated effects may be hazardous in certain respects. For example, if it be desirable to cause leucocytes to migrate, either lipopolysaccharide or lipid fraction derived from it may be utilized. Slightly modified lipopolysaccharide material can be adsorbed on erythrocytes which can then be specifically agglutinated by antisera. Lipopolysaccharide preparations from *E. coli* have been shown to have a marked ability to cause the Schwartzman phenomenon. (E. Neter, E. A. Mirand, O. Westphal, and O. Lüderitz, J. Bacteriology 74, 111 [1957]). This sensitization, consequently followed by hemorrhagic necrosis, would be a distinct hazard should such materials be injected repeatedly in a course of therapy.

Lipids, such as Lipid A obtained from lipopolysaccharides of *E. coli* cells, were found to be less toxic than the bacterial endotoxin or lipopolysaccharide from which it was prepared, but nevertheless was useful for causing a rise in host resistance or non-specific immunity (measured by ability to withstand deliberate bacterial challenge). The previous method of preparation of such lipid from bacterial cells required that the cells be isolated by centrifugation, then slurried with water and allowed to autolyze. This suspension was then treated with large volumes of liquefied phenol, heated, cooled, and separated; the phenol phase being retreated with additional water and the water phases combined and dialyzed. The undialyzable contents of the dialyzer bags were then concentrated and precipitated with alcohol and washed with acetone; this yielded crude lipopolysaccharide containing some nucleic acids. In the older previous processes, further purification of the lipopolysaccharide was done by fractional precipitation with ethanol, involving several steps. Finally, the purified lipopolysaccharide was treated with acid in order to free the lipid, which was then extracted with chloroform, thereby separating the lipid having host resistance-stimulating properties from other water soluble products formed by degradation of the lipopolysaccharide. In this older procedure the steps were many; some were extremely tedious, especially the extraction of the cells with phenol-water mixtures, which usually required centrifugation of a rather intractable emulsion, and the following dialysis of phenol-saturated water solutions in large volumes.

It is an object of the present invention to provide an improved process for the preparation of lipids from bacterial cells which avoids the difficult and tedious procedures of the prior art. Another object is to provide a simple process for the preparation of the lipid from the cells of *E. coli*. Other objects will be apparent from the detailed description of our invention hereinafter provided.

In acordance with my improved process, the lipids are conveniently and readily obtained by subjecting the cells of the bacteria to autolysis in water thereby liberating the lipopolysaccharides, hydrolyzing the lipopolysaccharides to the lipid in an aqueous medium, recovering the lipid by extraction with a water immiscible solvent for the lipid, and evaporating the resulting solvent extracts.

Thus, the lipid is obtained by suspending the bacterial cells in water, allowing the suspension to stand at room temperature for a period of time sufficient to effect autolysis of the cells, heating the resulting aqueous suspension to obtain a solution of the lipopolysaccharides, adding sufficient acid to make the solution from about one normal to about two normal, heating the acidified solution to a temperature between about 90–100° C. for sufficient time to hydrolyze the lipopolysaccharides, extracting the lipids from the resulting acidified, aqueous suspension with a suitable immiscible solvent such as chloroform, and evaporating the resulting solvent extracts.

The process of the present invention therefore provides a simple, economical method whereby the lipid can be readily recovered commercially. Thus, this method avoids the need to work with large amounts of phenol and a dialysis which were previously used in the separation and recovery of lipids.

In accordance with a preferred embodiment of my invention, I have found that the lipids are most conveniently prepared by heating dried, defatted cells with water, separating the aqueous solution, acidifying and reheating the aqueous solution, extracting the resulting acidified aqueous suspension with a suitable immiscible solvent for the lipid, and concentrating the resulting solvent extract.

The dried, defatted cells of the bacteria can be prepared in accordance with methods known in this art. Thus, they are conveniently prepared by slurrying the cells separated from the broth with acetone and petroleum ether and recovering the solid cellular material.

In accordance with my invention, the dried, defatted cells are suspended in water and the cell suspension is boiled for one hour, cooled and centrifuged to remove cell debris. The supernatant solution is treated with acid in sufficient quantity so that the whole is made about 1 N in acidity, then is heated rapidly to 90–100° C. inside temperature, held at this temperature for a period of more than 15–20 minutes but not longer than one hour, then cooled rapidly to room temperature or below. Some variations will be necessitated by the available equipment and the length of time for heating and subsequent cooling. The generally preferred conditions are holding at 94–96° C. for one half hour followed by rapid cooling to room temperature.

The acid strength can be varied from substantially less than normal to substantially more than two normal; the processing time being varied depending upon the acidity of the solution. The acid used is not critical, although it is most convenient to use hydrochloric acid since this is convenient in that any traces remaining in extracts are readily volatilized. It is obviously anticipated that any suitable source of protons for catalyzing hydrolysis may be used, since the nature of the hydrolytic reaction is ordinarily unaffected by the anion of the acid.

After cooling, the lipid is easily isolated by extraction of the aqueous acid reaction mixture with a suitable immiscible solvent for the lipid, such as chloroform, in the usual manner. Chloroform is the preferred solvent, since the lipid, which has host resistance-stimulating properties, which is set free by the hydrolytic step, is not as completely and readily soluble in other solvents such as diethyl ether, petroleum fractions, benzene, or the like.

Alternatively, the process can also be carried out by simply hydrolyzing the total suspension of bacterial cells in water by treatment with acid added in quantities such that the whole suspension is made one to five normal in effective acidity, and heating at 90–100° C. for one-half hour to three hours. The preferred conditions are one-half hour with three normal acid. The lipid set free from the lipopolysaccharide of the bacterial cell walls is then recovered as described above, by extraction with a suitable immiscible solvent such as chloroform. Evaporation of the solvent affords the lipid.

Further solvent purification may be applied by combinations of solvents, such as extraction with ethyl formate, or petroleum ether (B.P. 40–60° C.), and removal of the soluble material pursuant to methods known in the art. The residue may be further treated by dissolving it in pyridine, and addition of methanol. The resulting precipitated solids are removed by filtration, and the lipid is recovered from the filtered solution by concentration.

The lipid products obtained in accordance with the procedures of the present invention are biologically active. Thus, upon administering these lipids to mice and then experimentally infecting these animals, the lipids are shown to have the unique property of increasing the animals' resistance to infection. These lipid products have not yet been shown to be useful in humans. Upon complete hydrolysis of the products of this invention, a mixture of fatty acids, includnig lauric acid, myristic acid, palmitic acid and β-hydroxy myristic acid is obtained.

The lipid preparations produced by the means hereinbefore described are assayed for their activity in provoking an increase of host resistance or non-specific immunity as follows:

White female mice (as obtained from commercial breeders) of 16–20 grams weight per individual are housed, and caged by normal laboratory practice, with commercial mouse rations and water given ad libitum. Aqueous suspensions of the lipid to be tested are given intraperitoneally 48 hours prior to challenge. Convenient dosages are 500 micrograms of lipid and graded dosages to 10 micrograms, per mouse. Ordinarily, 10 mice will be used per group, and one group per dosage level. At least one group of mice is left untreated, for controls. A brain-heart infusion broth of the challenge bacterium, *Klebsiella pneumoniae*, strain AD, is prepared by conventional means of inoculation and six hours fermentation. The number of live bacteria per unit volume is established by conventional dilution and microbial plating techniques. A challenge dose of such bacterial infusion, suitably diluted, is administered intraperitoneally to all animals; the dilution chosen is ordinarily such that 80 to 100% mortality occurs in the control animals in one to five days, as established by prior experimentation. The animals left alive in each group are counted daily for 15 to 20 days. In the groups which receive active samples of lipid prepared as specified hereinbefore, a preponderant number of mice remain alive for the whole period; ordinarily this is more than five of ten and often nine of ten in groups which receive higher dosages (500 or 250 micrograms); whereas substantially all of the mice in the control group succumb from the challenge infection in five days or less.

The following examples are illustrative, but not restrictive, of the invention:

*Example 1*

A suspension was made of approximately 100 g. of dry, defatted *E. coli* cells prepared as described below in about 2 liters of distilled water, and the suspension was boiled under reflux for an hour, cooled rapidly to 25°, and centrifuged at 20,000 r.p.m. A clear brown supernatant solution of 1,600 ml. volume was obtained. To this solution was added 6 N hydrochloric acid, with stirring, until the mixture tested acid to Congo Red indicator; then 320 ml. more of 6 N acid was added to bring the whole solution to a strength of 1 N in effective acidity. The solution was stirred and heated rapidly on the steam bath to an inside temperature of 94° C. This temperature was maintained for 30 minutes, after which the solution was cooled rapidly to 25° C., and extracted with four portions of chloroform, (the first being 800 ml., the latter three 400 ml. each).

The combined chloroform extracts were washed with two 500 ml. portions of saturated sodium chloride solution, dried over anhydrous sodium sulfate, filtered and evaporated under reduced pressure; thereby was produced a 0.71 g. of residue containing the crude host resistance-active lipid from the bacterial cells.

The *E. coli* cells used as starting material above were prepared and then dehydrated and defatted as follows:

An inoculum is prepared in a conventional shaker flask by conventional aerobic techniques from *Escherichia coli* (Krögerserotype-08) in a medium constituted from:

| | Percent |
|---|---|
| Commercial meat extract | 0.3 |
| Sodium chloride | 0.5 |
| Bacto-peptone (Difco) | 1 |
| Dextrose | 1 | in distilled water, pH approximately 7.0. The seed culture is fermented at 37° C. for 24 hours and charged by conventional sterile techniques to more of the same medium in the final fermentor; aerobic fermentation is continued 24 hours at 37° C. with good aeration and stirring. Better growth is obtained if acidity is neutralized continuously by addition of caustic, thereby holding the pH substantially at 7. Final cell yields on various runs average 2.8 g. per liter of finished cell broth.

A cell broth of *Escherichia coli* was dehydrated and defatted by the following means: After removal of the bulk of supernatant fluid medium by means of a Titan Superjector centrifuge, 4 volumes of acetone were added to the cell concentrate and mixed to coagulate and partially dehydrate the cell paste; the cell residue was then separated by centrifugation in a Sharples high speed centrifuge, and retreated in the same manner twice with two volumes of acetone by slurrying and centrifugation. The resulting cell residue was similarly washed twice with two volumes of petroleum ether, and dried in air. The dried cells may then be made into a suspension with water for autolysis, or stored for future use.

*Example 2*

Host resistance-active lipid prepared as exemplified in Example 1 may be further purified by means of solvent treatment as follows:

A sample of 0.71 g. of crude lipid as obtained from chloroform extraction residues was triturated four times with 25 ml. portions of ethyl formate. The undissolved solids were separated in each step by centrifugation; finally, drying this residue in vacuo gave 247 mg. of light tan solid.

This solid was dissolved in a minimal amount of pyridine (approximately 2 ml.). The resulting solution was diluted by addition of 200 ml. of commercial anhydrous methanol.

The precipitated solids were removed by filtration. The filtrate was concentrated to dryness under reduced pressure, leaving a tan, glassy residue weighing 183 mg. This product was triturated with three 20 ml. portions of petroleum ether (B.P. 40–60° C.). The solids were collected by centrifuging and then dried in vacuo giving 126 mg. of a tan glass. This lipid prepared in this manner promotes an increase in host resistance. A white fluffy form, convenient for handling and subdivision, etc., is prepared by dissolving such lipid in 3 ml. of pyridine, diluting the solution with 10 ml. of water and freeze-drying the emulsion to give a fluffy, dry, powdery preparation of such lipid.

A portion of the 126 mg. of lipid was suspended in water at a concentration of 300 micrograms per ml. for administration to the mice intraperitoneally.

Following the assay procedure described above, doses of 250 micrograms per mouse, 50 micrograms per mouse and 10 micrograms per mouse were administered in groups of ten mice per dose level, 48 hours previous to challenge. Challenge infection with Klebsiella pneumoniae was given by injecting with 100,000 such bacteria per mouse. A group of 26 mice, previously untreated were also infected simultaneously. After five days, only two of the twenty-six mice in the control group were alive, whereas 8 of 10 mice which received 250 micrograms of lipid were alive; 5 of the 10 mice which had received 50 micrograms of lipid were alive, and 3 of the 10 mice which had received 10 micrograms of lipid were alive.

*Example 3*

The process for preparation of active lipid from *E. coli* cells is carried out by isolating the cells free of extraneous fat after the manner of Example 1. Dried bacterial cells (wt., 100 g.) are then made into a suspension with approximately 2 liters of distilled water and this is allowed to stand for two days at room temperature, in order that autolysis may proceed. The hydrolysis and isolation of product is then carried out substantially according to the directions of Example 1, thereby producing host resistance active lipid.

*Example 4*

The isolation of cells, substantially dry and free of extraneous fatty material is carried out as described in Example 1. The production of the desired lipid is then carried out substantially by the procedure of Example 1, except that 1 N sulfuric acid is used for the acid treatment for hydrolysis instead of hydrochloric acid. Subsequent extraction with chloroform as set forth in Example 1 yields active lipid.

*Example 5*

Host resistance-active lipid is prepared by defatting and drying cells substantially after the manner shown in Example 1; suspending the cells in water as set forth in Example 3; after allowing the suspension to stand approximately two days at room temperature, the whole is treated with hydrochloric acid in sufficient quantity to make the whole suspension effectively three normal in acidity; the whole suspension is then heated in the steam bath for one half hour, cooled and extracted with chloroform in the usual manner. The separation of the clear chlorofrom extracts in this case may be quite troublesome, but can be accomplished by vigorous centrifugation in the usual 250 ml. bottles. The isolation of the host resistance-active lipid is completed in the usual way described in Example 1.

*Example 6*

*E. coli* cells were prepared in shaker flasks by conventional aerobic techniques and separated from the medium as described in Example 1. A portion of this cell concentrate equal to 100 g. of dry cells was suspended in 2.0 liters of water. This mixture was kept under a thin layer of toluene at room temperature (25° C.) for two weeks in order to cause autolysis of the cells. The mixture was heated to reflux and the toluene allowed to distill off. The remaining aqueous suspension was kept at reflux for 60 minutes longer. The supernatant was obtained and subjected to hydrolysis, and the lipid product isolated essentially as described in Example 1. This product was further purified by the ethyl formate and methanol-pyridine solvent fractionation technique as described in Example 2 yielding 144 mg. of host resistance-active lipid.

Various changes and modifications of the invention can be made and, to the extent that such variations incorporate the spirit of this invention, they are intended to be included within the scope of the appended claims.

What is claimed is:

1. An improved process for the preparation of a lipid from *E. coli* bacterial cells containing lipopolysaccharides which comprises:
    (a) suspending dried, defatted *E. coli* bacterial cells in water to form an aqueous bacterial cell suspension;
    (b) heating said aqueous bacterial cell suspension to the boiling point for about one hour and then cooling;
    (c) separating the undissolved bacterial cell debris from the cooled aqueous solution;
    (d) adding acid to the aqueous solution in an amount sufficient to produce an aqueous acid solution between about one to two normal in acidity;
    (e) heating said aqueous acid solution to a temperature between about 90 to 100° C. for a period of time between about 15 to about 60 minutes;
    (f) rapidly cooling said aqueous acid solution to about 25° C.;
    (g) extracting the resulting cooled aqueous acid solution with a water-immiscible solvent for the lipid to obtain a solvent extract of lipid;
    (h) evaporating the said solvent extract to obtain active lipid.

2. The process of claim 1 wherein the acid is hydrochloric acid.

3. The process of claim 1 wherein the acid is sulfuric acid.

4. The process of claim 1 wherein the solvent is chloroform.

References Cited in the file of this patent

UNITED STATES PATENTS 2,340,318   Gerlough _____ Feb. 1, 1944

OTHER REFERENCES

Westphal: Angew Chem., vol. 66, 1954, pp. 407–417.
Howard: Nature, February 9, 1957, pp. 314–315.